(12) United States Patent
Yang

(10) Patent No.: US 8,682,163 B2
(45) Date of Patent: Mar. 25, 2014

(54) DETECTING METHOD, APPARATUS, AND SYSTEM IN AN OPTICAL DISTRIBUTION NETWORK

(75) Inventor: Sulin Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 188 days.

(21) Appl. No.: 13/188,681

(22) Filed: Jul. 22, 2011

(65) Prior Publication Data

US 2011/0274426 A1  Nov. 10, 2011

Related U.S. Application Data

(63) Continuation of application No. PCT/CN2009/074098, filed on Sep. 22, 2009.

(30) Foreign Application Priority Data

Jan. 23, 2009 (CN) .......................... 2009 1 0105299

(51) Int. Cl.
*H04J 14/02* (2006.01)
*H04B 10/071* (2013.01)

(52) U.S. Cl.
USPC .................. 398/72; 398/13; 398/21; 398/28; 398/67

(58) Field of Classification Search
USPC .............................. 398/13, 20, 21, 28, 67, 72
See application file for complete search history.

(56) References Cited

U.S. PATENT DOCUMENTS

| 2004/0247316 A1* | 12/2004 | Soto et al. ........................ 398/47 |
| 2007/0116467 A1 | 5/2007 | Kwon et al. |
| 2008/0044185 A1 | 2/2008 | Lee et al. |
| 2009/0016714 A1* | 1/2009 | Soto et al. ........................ 398/20 |
| 2011/0013904 A1* | 1/2011 | Khermosh et al. .............. 398/16 |

FOREIGN PATENT DOCUMENTS

| CN | 1866790 A | 11/2006 |
| CN | 1968056 A | 5/2007 |
| CN | 101232328 A | 7/2008 |
| CN | 101291176 A | 10/2008 |
| EP | 0 975 102 A2 | 1/2000 |
| JP | 2004-104177 A | 4/2004 |
| WO | WO 2008/101445 A1 | 8/2008 |

OTHER PUBLICATIONS

Kuramoto, et al., "Increasing FTTH Reliability between Premise and Indoor Lines", OWP1 pp. 1-3 2004.

(Continued)

*Primary Examiner* — Nathan Curs
(74) *Attorney, Agent, or Firm* — Leydig, Voit & Mayer, Ltd.

(57) ABSTRACT

A detecting method, an apparatus, and a system in an Optical Distribution Network (ODN) are provided. The method includes: an Optical Line Termination (OLT) reserves a test window, and an Optical Network Unit (ONU) stops sending an uplink signal in the test window, the OLT emits a downlink test signal having a wavelength the same as that of the uplink signal in the test window, the OLT receives backward signals of the downlink test signal, in which the backward signals include a backward scattered signal and a backward reflected signal, processes the backward signals, and obtains state information of the ODN according to the backward signals. The method does not need to add other hardware, and the downlink signal is sent normally in the downlink. The implementation is low in the cost and easy in the technology.

4 Claims, 6 Drawing Sheets

(56) References Cited

OTHER PUBLICATIONS

International Search Report from the Chinese Patent Office in International Application No. PCT/CN2009/074098 mailed Dec. 24, 2009.
Written Opinion of the International Searching Authority in International Application No. PCT/CN2009/074098 mailed Dec. 11, 2009.
Chinese Search Report in corresponding Chinese Patent Application No. 2009101052996 (Dec. 4, 2012).
Extended European Search Report in corresponding European Patent Application No. 09838653.5 (May 7, 2012).
Extended Supplemental European Search Report from the Munich Patent Office in International 09 83 8653.5-2415/2383908 PCT/CN2009/074098, dated Apr. 26, 2012.

* cited by examiner

DETECTING METHOD, APPARATUS, AND SYSTEM IN AN OPTICAL DISTRIBUTION NETWORK

CROSS-REFERENCE TO RELATED APPLICATIONS

This application is a continuation of International Application No. PCT/CN2009/074098, filed on Sep. 22, 2009, which claims priority to Chinese Patent Application No. 200910105299.6, filed on Jan. 23, 2009, both of which are hereby incorporated by reference in their entireties.

FIELD OF THE INVENTION

The present invention relates to the communications field, and in particular, to a detecting method, an apparatus, and a system in an Optical Distribution Network (ODN).

BACKGROUND OF THE INVENTION

Currently in the access network field, optical access booms when a Digital Subscriber Line (DSL) is fully developed, and particularly, a point-to-multipoint optical access technology, that is, a Passive Optical Network (PON), attracts attention again. Compared with point-to-point optical access, a PON central office is capable of dividing one fiber into decades of or even more paths of fibers to be connected to users, thereby significantly reducing a network-establishment cost. Currently, representative PON technologies include a Gigabit-Capable Passive Optical Network (GPON) technology and an Ethernet Passive Optical Network (EPON) technology, in which the GPON technology has properties of having a high line rate and complete maintenance and management functions.

As shown in FIG. 1, a structure of a PON system includes three parts, that is, an Optical Line Termination (OLT), an Optical Distribution Network (ODN), and an Optical Network Unit (ONU)/Optical Network Termination (ONT).

The OLT provides a network side interface for the PON system, and is connected to one or more ODNs. The ODN is a passive optical splitter, transmits downlink data of the OLT to each ONU in a drop manner, and simultaneously transmits uplink data of multiple ONUs/ONTs to the OLT in an aggregating manner. The ONU provides a user side interface for the PON system, and an uplink is connected to the ODN. If the ONU directly provides a user port function, such as an Ethernet user port used by a Personal Computer (PC) for accessing the Internet, the ONU is referred to as an ONT, and the ONU mentioned in the following collectively includes the ONU and the ONT.

The ODN is generally divided into three parts, that is, a passive optical splitter, a feed fiber, and a distribution fiber and a drop fiber, in which the distribution fiber and the drop fiber may be collectively referred to as a branch fiber. FIG. 1 is a structural diagram of an ODN with level-2 splitting, and an ODN with only level-1 splitting only has the feed fiber and the drop fiber.

A link from the OLT to the ONU is referred to as the downlink, and a link from the ONU to the OLT is referred to as the uplink. Due to optical characteristics, the downlink data is broadcasted to each ONU, and the OLT allocates sending intervals for the uplink data sending of each ONU, in which time division multiplexing is performed.

The uplink of the PON system adopts a wavelength of 1310 nm, and the downlink of the PON system adopts a wavelength of 1490 nm. Light of the uplink and the downlink may be transmitted in the same fiber or by adopting different fibers.

The line between the OLT and the ONU may be abnormal, such as breaks, so that normal services are influenced. Therefore, the line needs to be detected, so as to evaluate a line state.

The line may be detected in the following manners. In the first manner, the OLT correspondingly modulates or encodes a downlink data signal, so as to superpose test signals. After receiving a backward reflected signal and/or scattered signal of a downlink signal, a receiver of an Optical Time Domain Reflectometer (OTDR) obtains a reflected and scattered signal of the test signal superposed on the downlink data signal after removing a reflected and scattered signal of a downlink digital signal through filtering. When being transmitted through a fiber, the test signal generates a backward scattered signal due to a property (medium non-uniformity) of the fiber itself, or generates a reflected signal due to a fiber link event (connection, breakage, and fiber end). Line attenuation situations distributed along a fiber length and an event curve on the line are calculated and obtained according to an intensity of the detected backward scattered signal or reflected signal and time of arrival, so as to implement the detection of the ODN. This method needs to perform amplitude modulation control on a laser in a downlink direction, and to modulate an amplitude of a data signal by 5% to 10%, and the backward reflected and scattered signals are very weak, so that the processing difficulty is large.

A test method shown in FIG. 2 may also be adopted, in which a laser of a data transceiver sends a downlink data signal with a wavelength of $\lambda_d$, and a receiver of the data transceiver receives an uplink data signal with a wavelength of $\lambda_u$. A laser of the OTDR sends a test signal with a wavelength of $\lambda_t$, and a receiver of the OTDR still receives a backward scattered signal of the test signal with the wavelength of $\lambda_t$ and processes the received backward scattered signal, so as to implement the monitoring of the ODN link. Because a test wavelength is different from a data wavelength, a filter needs to be placed before the ONU to get rid of the influence of the test wavelength on the receiver of the ONU, so that the cost is high.

SUMMARY OF THE INVENTION

Embodiments of the present invention provide a detecting method, an apparatus, and a system in an ODN, which are simple in technical implementation and do not influence downlink signal sending.

An embodiment of the present invention provides a detecting method in an ODN, the ODN being configured to be connected to a central office subsystem and multiple ONUs, where the method includes:

specifying, by the central office subsystem, a test window;

sending, by the central office subsystem, an optical signal bearing a test excitation signal to the ODN in the specified test window with a second wavelength, in which the second wavelength is the same as a wavelength of an optical signal used for uplink data transmission; and receiving, by the central office subsystem, an optical signal reflected and/or scattered by the ODN in the specified test window, performing time-domain or frequency-domain analysis on the received optical signal reflected and/or scattered by the ODN, and obtaining line evaluation information of the ODN.

An embodiment of the present invention provides a central office subsystem, including an ODN interface, an optical receiver, a first optical emitter, a second optical emitter, a test processing unit, and a control unit; where the ODN interface is configured to be connected to an ODN;

the optical receiver is coupled with the ODN interface, and is configured to receive an optical signal used for uplink data transmission, in which a wavelength of the optical signal used for uplink data transmission is a second wavelength;

the first optical emitter is coupled with the ODN interface, and is configured to send an optical signal used for downlink data transmission, in which a wavelength of the optical signal used for downlink data transmission is a first wavelength;

the test processing unit is configured to generate a test excitation signal; send the generated test excitation signal to the second optical emitter so that the second optical emitter emits an optical signal bearing the test excitation signal with the second wavelength; perform time-domain or frequency-domain analysis on an optical signal reflected and/or scattered by the ODN; and obtains line evaluation information of the ODN; and the control unit is configured to specify a test window, and control the test processing unit to send and receive a signal in the specified test window.

An embodiment of the present invention provides an optical communication system, including a central office subsystem and an ONU, the central office subsystem being connected to the ONU through an ODN, where the central office subsystem specifies a test window, and sends an optical signal bearing a test excitation signal through the ODN in the specified test window with a second wavelength, in which the second wavelength is the same as a wavelength of an optical signal used for uplink data transmission; and the central office subsystem receives an optical signal reflected and/or scattered by the ODN in the specified test window, performs time-domain or frequency-domain analysis on the received optical signal reflected and/or scattered by the ODN, and obtains line evaluation information of the ODN.

It can be seen that, in the embodiments of the present invention, when the line is detected, the downlink continues to send the downlink signal, and simultaneously sends the test signal in the downlink direction, while the uplink does not send the uplink signal in the test window. In order to achieve the effect, the OLT only needs to establish a test window, and instructs all the ONUs to send no uplink signal in this window, so that the technical implementation is simple and the downlink signal sending is not influenced. Meanwhile, because no other functional modules need to be added, the cost is low.

DETAILED DESCRIPTION OF THE EMBODIMENTS

The present invention is described in the following in a clear manner with reference to the accompanying drawings.

An embodiment of the present invention provides a detecting method in an ODN, the ODN being configured to be connected to a central office subsystem and multiple ONUs, and the method specifically includes the following steps.

The central office subsystem specifies a test window.

The central office subsystem sends an optical signal bearing a test excitation signal to the ODN in the specified test window with a second wavelength, in which the second wavelength is the same as a wavelength of an optical signal used for uplink data transmission.

The central office subsystem receives an optical signal reflected and/or scattered by the ODN in the specified test window, performs time-domain or frequency-domain analysis on the received optical signal reflected and/or scattered by the ODN, and obtains line evaluation information of the ODN.

Figure 1:
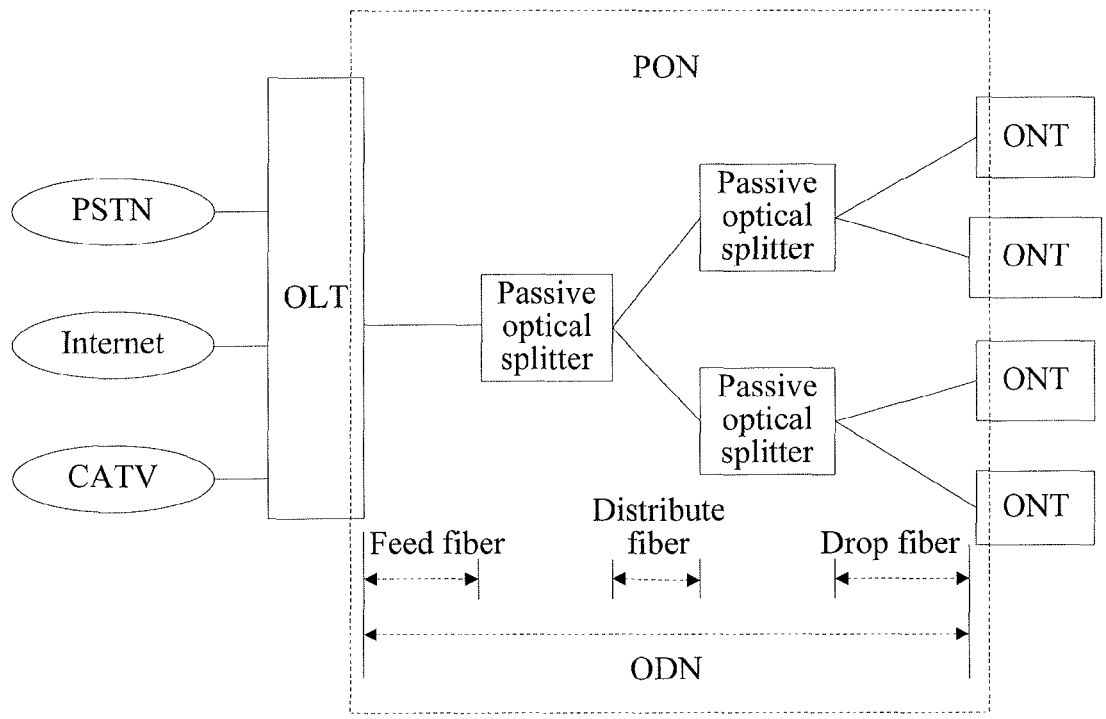
FIG. 1 is a schematic diagram of an existing PON system.
Figure 2:
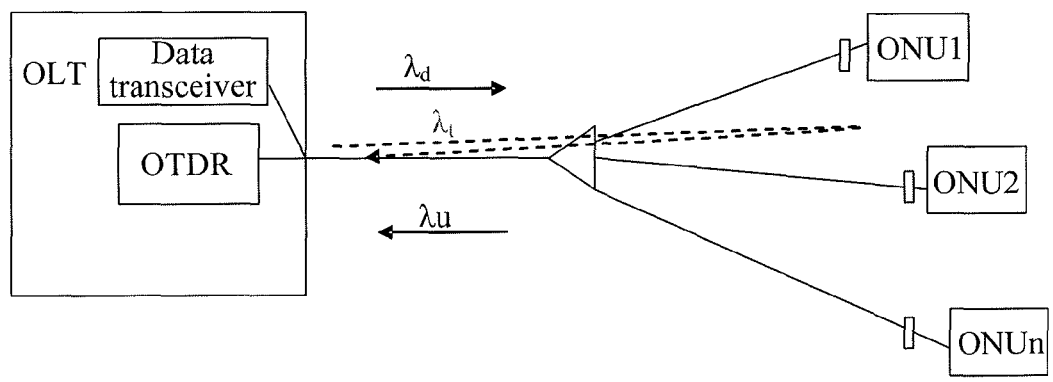
FIG. 2 is a schematic diagram of an ODN detection process in which an OTDR sends signals with wavelengths different from those of signals sent in an uplink and a downlink in the prior art.
Figure 3:
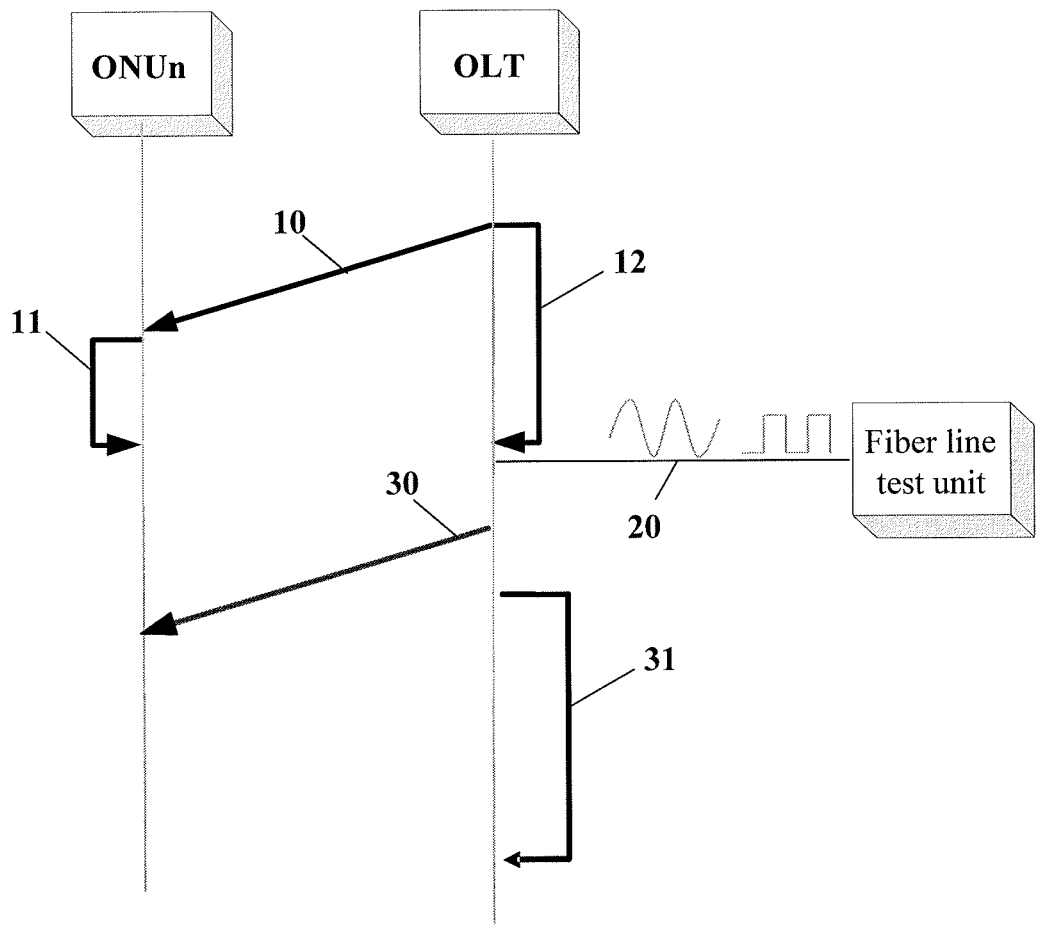
FIG. 3 is a schematic diagram of a detecting method in an ODN according to an embodiment of the present invention.

The specific process is described in the following by taking a GPON as an example. As shown in FIG. 3, the process includes the following steps.

Step 10: The central office subsystem sends an optical signal with a first wavelength used for downlink data transmission to an ONU (ONUn) through the ODN, in which the optical signal with the first wavelength includes a notification message used for notifying the ONU of stopping sending an uplink signal. It is known to persons skilled in the art that, the central office subsystem may be an OLT, or another equipment with functions similar to or the same as those of the OLT.

Before the test, the OLT may instruct all the ONUs to stop sending the uplink data through a Halt instruction and reserve a test window. The Halt instruction may be an ONU Halt instruction consistent with an activation process or ranging process defined in a current GPON standard.

In order to prevent the ONU from sending the uplink data, the central office subsystem may not send any uplink authorized BWMAP.

The OLT may also adopt a new Operations Administration and Maintenance (OAM) message, in which the OAM message includes Operation and Maintenance Center Information (OMCI) or a Physical Layer OAM (PLOAM) message. All the ONUs are notified of not uploading the uplink signal or turning off lasers of the ONUs during a certain time period, so as to reserve the test window. If the ONU is instructed to turn off its laser, the ONU needs to be instructed to turn on its laser after a test period.

After receiving a command for stopping sending the uplink data, the ONU stops sending the uplink data after response time 11. The OLT sends the test excitation signal after waiting time 12, and test time 31 is the time of the specified test window.

Specifically, the reserved test window is dependent on a fiber link length between the OLT and the ONU. For example, if the fiber length is 20 Km, because the optical signal takes about 100 μs to be one-way transmitted for 20 Km in the single-mode fiber, the test window sends the excitation signal only when data sent by a last ONU reaches the OLT, and the excitation signal is reflected/scattered back only when reaching a fiber end at which a furthest ONU is located, the length of the test window or a test quiet window is at least 300 uS. In an actual application, because a certain margin need to be considered, the test window may be set as required.

Step 20: The OLT sends an optical signal with a second wavelength bearing the test excitation signal to the ODN in the specified test window, in which the second wavelength is the same as the wavelength of the optical signal used for uplink data transmission.

When the uplink signals of all the ONUs reach the OLT, the OLT instructs a time-domain or frequency test function to send a downlink test signal of 1310 nm, in which the downlink test signal may be any one of a square wave, a pulse, a sine modulation wave, a periodically varying frequency signal, and a special feature signal.

The OLT receives the optical signal reflected and/or scattered by the ODN in the specified test window, performs time-domain or frequency-domain analysis on the received optical signal reflected and/or scattered by the ODN, and obtains the line evaluation information of the ODN.

The time-domain or frequency test function receives and monitors the backward scattered and/or reflected signal in the test window, and calculates and obtains an attenuation curve and an event curve of the line according to the backward scattered and/or reflected signal. Different processing manners are adopted for different types of the sent test signals. For example, when a pulse signal is taken as the test excitation signal, a common OTDR processing algorithm may be adopted to calculate features of the line by detecting an intensity of the reflected and/or scattered signal and time of arrival. When the sent test excitation signal is a modulation signal, a pseudo-random signal, or another signal, the features of the line may be obtained by performing relevant calculation on the excitation signal and the reflected and/or scattered signal. Various existing time-domain or frequency reflectometers may be referred to for the corresponding processing algorithm, and the time-domain or frequency reflectometers may be, but not limited to, such test technologies as an OTDR, a C-OTDR (performing relevant calculation on the excitation signal and the reflected signal to obtain the line features), and an Optical Frequency-Domain Reflectometry (OFDR) (sending a signal at a particular frequency, and detecting line features at a corresponding frequency).

One or more times of measurement may be performed as required in the test window.

Step 30: The central office subsystem restores the uplink data transmission of the ONU after the specified test window ends.

Specifically, as regards how to restore the uplink data transmission of the ONU, bandwidth allocation may be performed on the ONU again, or a command for instructing the ONU to turn on the laser is sent. The specific manner adopted should correspond to the manner adopted in step 10.

The above steps need to be implemented coordinately by the OLT and the time-domain or frequency test function. Before the test, the OLT sends an instruction message to notify the ONU of halting the uplink signal sending or turning off the laser for a certain time period. When uplink information of the last uplink authorized ONU reaches the OLT before the test, the time-domain or frequency test function needs to be notified of sending the test signal. After the test period ends, the OLT performs uplink authorization on the ONU or turns on the laser of the ONU.

Figure 4:
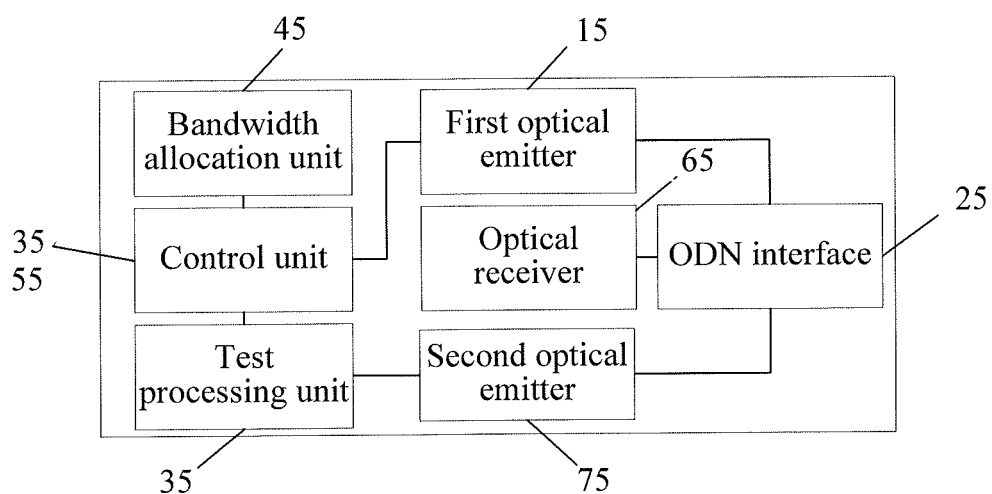
FIG. 4 is a schematic diagram of a central office subsystem according to an embodiment of the present invention.

An embodiment of the present invention provides a central office subsystem. As shown in FIG. 4, the central office subsystem includes an ODN interface 25, a first optical emitter 15, an optical receiver 65, a second optical emitter 75, a test processing unit 35, a control unit 55, and a bandwidth allocation unit 45.

The ODN interface 25 is configured to be connected to an ODN.

The first optical emitter 15 is coupled with the ODN interface 25, and is configured to send an optical signal used for downlink data transmission, in which a wavelength of the optical signal used for downlink data transmission is a first wavelength.

The optical receiver 65 is coupled with the ODN interface 25, and is configured to receive an optical signal used for uplink data transmission, in which a wavelength of the optical signal used for uplink data transmission is a second wavelength.

The second optical emitter 75 is coupled with the ODN interface 25, and is configured to emit an optical signal bearing a test excitation signal with the second wavelength.

The test processing unit 35 is configured to generate a test excitation signal; send the generated test excitation signal to the second optical emitter 75 so that the second optical emitter 75 emits the optical signal bearing the test excitation signal with the second wavelength; perform time-domain or frequency-domain analysis on the optical signal reflected and/or scattered by the ODN; and obtain line evaluation information of the ODN.

The control unit 55 is configured to specify a test window, and control the test processing unit 35 to send and receive a signal in the specified test window.

The bandwidth allocation unit 45 is configured to perform uplink timeslot allocation on the uplink data transmission, specify a null window forbidding any ONU to send the uplink data as the test window, and notify the control unit 55 of the specified test window.

Specifically, when a test needs to be performed, the test window needs to be determined firstly, and one way of determining the test window is as follows. The bandwidth allocation unit 45 performs uplink timeslot allocation on the uplink data transmission, specifies a null window forbidding any ONU to send the uplink data as the test window, in which terminal equipment corresponding to other equipment may also be specified. After the allocation, the bandwidth allocation unit 45 notifies the control unit 55 of the specified test window.

The control unit 55 controls the first optical emitter 15 to send allocation information of the bandwidth allocation unit 45 to the ONU through the ODN interface 25, in which the sending manner may be, but not limited to, broadcasting.

In another way of determining the test window, the control unit 55 controls the first optical emitter 15 to send a message for instructing all the ONUs to stop sending the uplink data or to turn off the laser, in which the message may be a halt instruction, and the halt instruction may be the ONU Halt instruction consistent with the activation process or ranging process defined in the current GPON standard; and the message may also be a new OAM message, such as OMCI or a PLOAM message. The control unit 55 may determine the test window without sending any uplink authorized BWMAP.

Time to start the test may be pre-configured or be triggered according to trigger conditions, in which the trigger conditions may be, but not limited to that, a Medium Access Control (MAC) processing unit 300 detects the increase of the line bit error rate or the occurrence of a certain alarm, such as a Loss Of Signal (LOS) advanced; or an operation and maintenance personnel delivers an explicit instruction to start the test.

When specifying the test window, the control unit 55 may control the first optical emitter 15 to send a notification message for notifying the ONU of stopping sending an uplink data transmission signal. The downlink message sent by the first optical emitter 15 reaches the ONU end through the ODN interface 25 and the ODN, and the ONU stops sending the uplink data or turns off the laser after receiving the message.

In addition, the control unit 55 may also specify the test window by controlling the bandwidth allocation unit 45. When a test needs to be performed, and if the bandwidth allocation unit does not perform uplink authorization on the ONU, the ONU does not send the uplink data.

The ODN interface 25 sends the downlink message sent by the first optical emitter 15 to the ONU, and the ONU stops sending the uplink data or turns off the laser after receiving the message.

Because the OLT performs the bandwidth allocation on the ONU before the test window is determined, the optical receiver 65 continues to receive the uplink data through the ODN interface 25 after the test window is determined. After receiving the uplink data of the furthest ONU, the control unit 55 controls the test processing unit 35 to generate the test excitation signal. After generating the test excitation signal, the test processing unit 35 sends the test excitation signal to the second optical emitter 75.

The second optical emitter 75 bears the test excitation signal in the signal with a wavelength the same as the uplink wavelength, and sends the signal out through the ODN interface 25.

The optical receiver 65 receives a reflected signal and/or scattered signal of the downlink signal bearing the test excitation signal sent from the ODN interface 25, and sends the received signal to the test processing unit 35 to be processed.

The test processing unit 35 receives the reflected signal and/or scattered signal of the test excitation signal, and performs the time-domain or frequency-domain analysis on the signal, so as to obtain the line evaluation information of the ODN.

When the test process ends, the control unit 55 controls the first optical emitter 15 to perform uplink authorization to all the ONUs, or instructs all the ONUs to turn on the laser emitter, or the bandwidth allocation unit 45 may perform bandwidth allocation on the ONU again. The specific manner adopted should correspond to the manner adopted for determining the test window.

Figure 5:
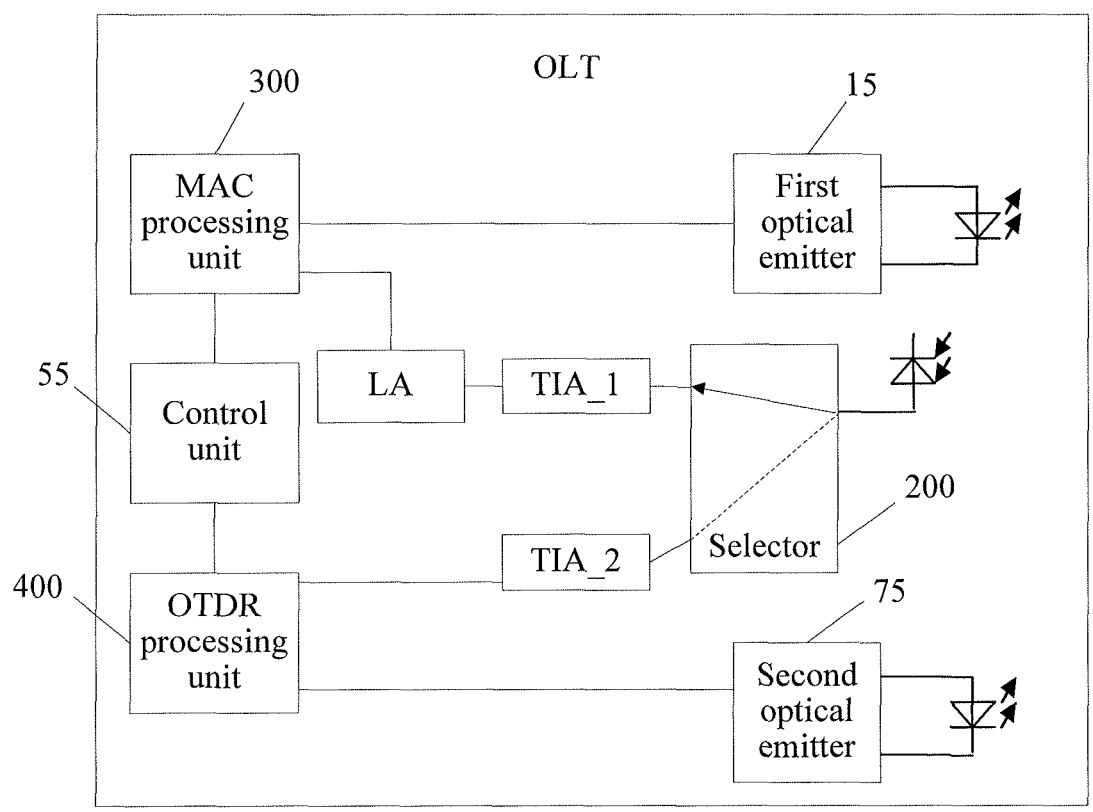
FIG. 5 is a schematic diagram of a first embodiment of the central office subsystem according to the embodiment of the present invention.

More specifically, the test processing unit 35 may further include the MAC processing unit 300 and an OTDR processing unit 400. As shown in FIG. 5, persons skilled in the art may know that, the test processing unit 35 may also be formed of the MAC processing unit and an OFDR processing unit, or the MAC processing unit and a C-OTDR processing unit. The OTDR processing unit, OFDR processing unit, or C-OTDR processing unit processes the test signal and the reflected/scattered signal of the test signal in a processing method similar to that of test equipment of the OTDR, OFDR, or C-OTDR. The first optical emitter 15 is a Laser Diode Driver 1 (LDD 1), and the second optical emitter 75 is an LDD 2. The optical receiver 65 includes a selector 200, a Limiting Amplifier (LA), a Transimpedance Amplifier_1 (TIA_1), and a TIA_2.

The MAC processing unit 300 may also include a bandwidth allocation unit, which usually is a Dynamic Bandwidth Allocation (DBA) function in a PON. The test start is triggered by the trigger conditions. After the test start is triggered, the control unit 55 notifies the MAC processing unit 300 of reserving the test window of a certain length. The execution of the reserving action is processed by the MAC processing unit 300. Definitely, the control unit 55 may also be implemented in the MAC processing unit 300.

The selector 200 in the optical receiver 65 is connected to the TIA_1 and the TIA_2, and the selector 200 may be, but not limited to, an electronic switch. The TIA_1 is configured to send the received uplink signal of the ONU to the MAC processing unit 300 to be processed; and the TIA_2 is configured to send the received backward signal of the test excitation signal to the OTDR processing unit 400 to process, in which the backward signal includes the scattered signal and/or the reflected signal. The selector 200 is controlled by the control unit 55. When the uplink data of the ONU is communicated, the control unit 55 controls the selector 200 to be connected to the TIA_1, and in the test window, the control unit 55 controls the selector 200 to be connected to the TIA_2.

The MAC processing unit 300, the LDD 1, and a corresponding laser are configured to send the downlink signal to the ONU, in which the laser may be a Fabry-Perot (FP) Laser or a distributed Fabry-Perot (DFP) Laser. The OTDR processing unit 400, the LDD 2, and a corresponding laser are configured to send a downlink test excitation signal.

Figure 6:
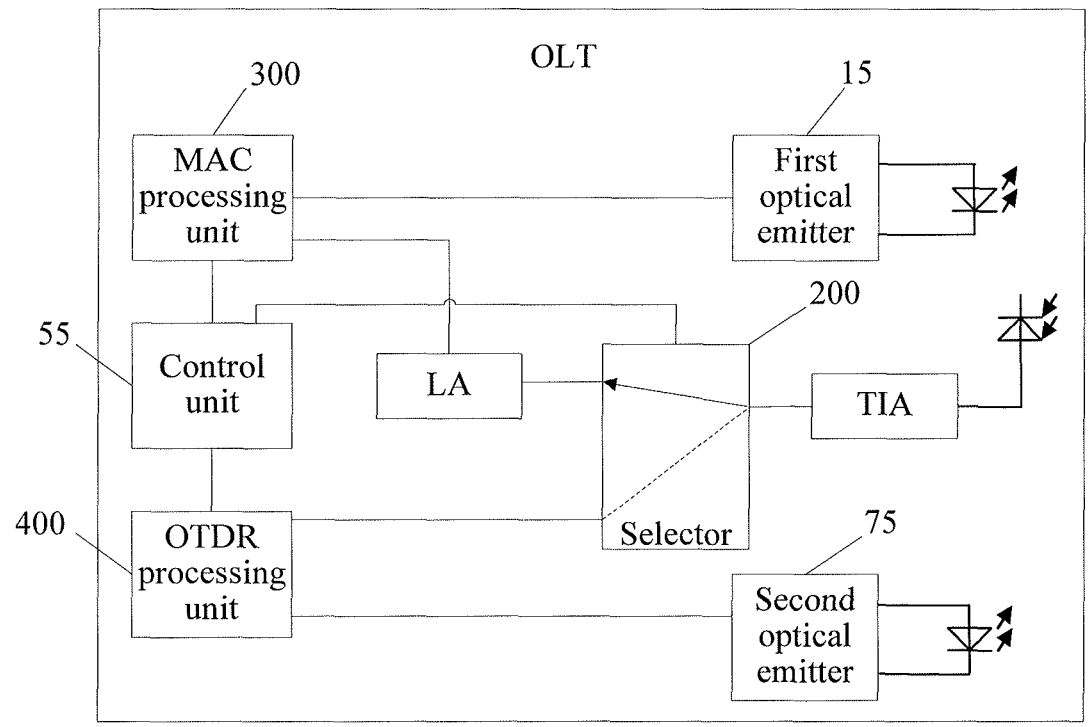
FIG. 6 is a schematic diagram of a second embodiment of the central office subsystem according to the embodiment of the present invention.

The central office subsystem may also be shown in FIG. 6, in which the optical receiver 65 is formed of a TIA, a selector 200, and an LA, and the selector 200 may be, but not limited to, an electronic switch. The selector 200 is controlled by the control unit 55. When the uplink data of the ONU is received, the control unit 55 controls the selector 200 to be connected to the TIA and the LA; and in the test window, the control unit 55 controls the selector 200 to be connected to the TIA and the OTDR processing unit 400. The MAC processing unit 300, the LDD 1, and a corresponding laser are configured to send the downlink signal to the ONU. The OTDR processing unit 400, the LDD 2, and a corresponding laser are configured to send the downlink test excitation signal.

Figure 7:
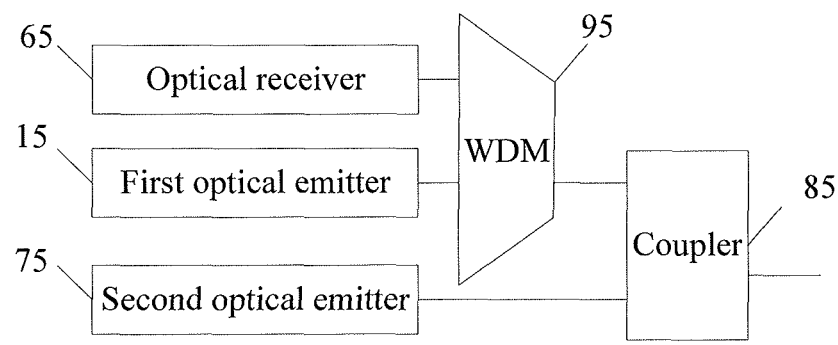
FIG. 7 is a schematic diagram of a third embodiment of the central office subsystem according to the embodiment of the present invention.

The central office subsystem may send a data signal and the test excitation signal simultaneously in the downlink. The downlink data signal is sent by the first optical emitter 15, and the test excitation signal is sent by the second optical emitter 75. The ODN interface 25 couples the two signals together to be sent through a fiber. As shown in FIG. 7, the ODN interface 25 may include a Wave-length Division Multiplexer (WDM) 95. In this embodiment, in order to couple the signals of the first optical emitter 15 and the second optical emitter 75, the ODN interface 25 further includes a coupler 85, and the coupler 85 may also be a splitter or a circulator. The coupler 85 is configured to couple the test excitation signal sent by the second optical emitter 75 with the downlink data signal sent by the first optical emitter 15. Persons skilled in the art may also know that, the coupler 85 may also be independent of the central office subsystem.

Specifically, the test excitation signal of the second optical emitter 75 is coupled with the data signal sent by the first optical emitter 15 by the coupler 85 after being wavelength division multiplexed by the WDM 95, and the coupled signal is transmitted to the ONU end through the ODN. The test excitation signal may be reflected and/or scattered by the ODN when being transmitted to the ONU end in the ODN, and the backward reflected/scattered signal is received by the optical receiver 65 after passing through the coupler 85 and the WDM 95.

Figure 8:
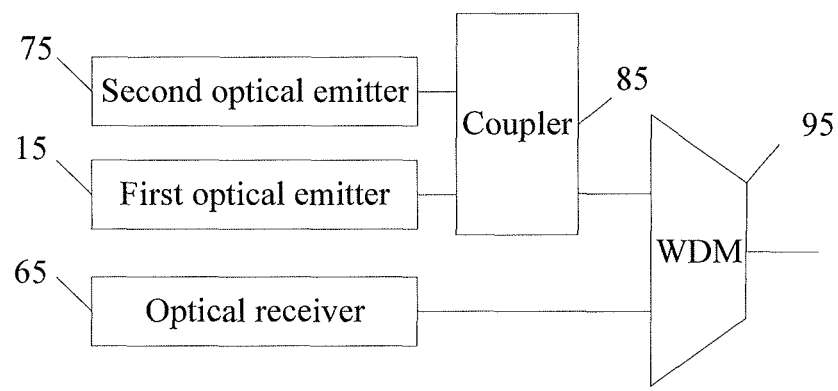
FIG. 8 is a schematic diagram of a fourth embodiment of the central office subsystem according to the embodiment of the present invention.

The coupler 85 and the WDM 95 in the ODN interface 25 may also be shown in FIG. 8. The downlink data signal emitted by the first optical emitter 15 and the test excitation signal emitted by the second optical emitter 75 are firstly coupled by the coupler 85, and then are wavelength division multiplexed by the WDM 95. The backward reflected and scattered signal of the test excitation signal is received by the optical receiver 65 after passing through the WDM 95.

The test processing unit 35 may also be disposed externally. For example, an external OTDR or OFDR is adopted, in which information interaction between the OLT and the OTDR may be directly performed. For example, both the OLT and the OTDR/OFDR provide an interface to be connected to each other, one of the OLT and the OTDR/OFDR acts as a main controller, and the other acts as a subordinate. In this embodiment, the OLT as the main controller and the OTDR as the subordinate are taken as an example for illustration. When a certain condition is triggered, in which the condition may be occurrence of an LOS alarm or manual triggering, the OLT is required to start the test process, and the specific trigger conditions may be set by network management equipment or an operating staff. After the OLT enters the test state, data is normally sent in the downlink direction, and the test window is started, and the starting process is described in step 10 in the method embodiment. A size of the window may be set as required, and specifically, the size of the window may be set by considering factors such as necessary times of the test and a line length. The OLT notifies the OTDR of sending the test signal after the uplink data of the last uplink authorized ONU reaches the OLT. After receiving a command of the OLT, the OTDR starts the test, sends the test signal, receives the backward reflected and scattered signal, and calculates and obtains a state of the line link. A test result may be transferred to the OLT through a corresponding channel, in which the channel may be, but not limited to, a data interface. The test result may also be transferred to a corresponding system or equipment through a corresponding channel, so as to be further analyzed and processed. After the test window ends, the OLT performs uplink authorization on the ONU, and the ONU restores normal transmission of the uplink signal. The OLT and the OTDR may also be connected through third equipment, and the third equipment may be, but not limited to, an Ethernet switch or a network management system.

Figure 9:
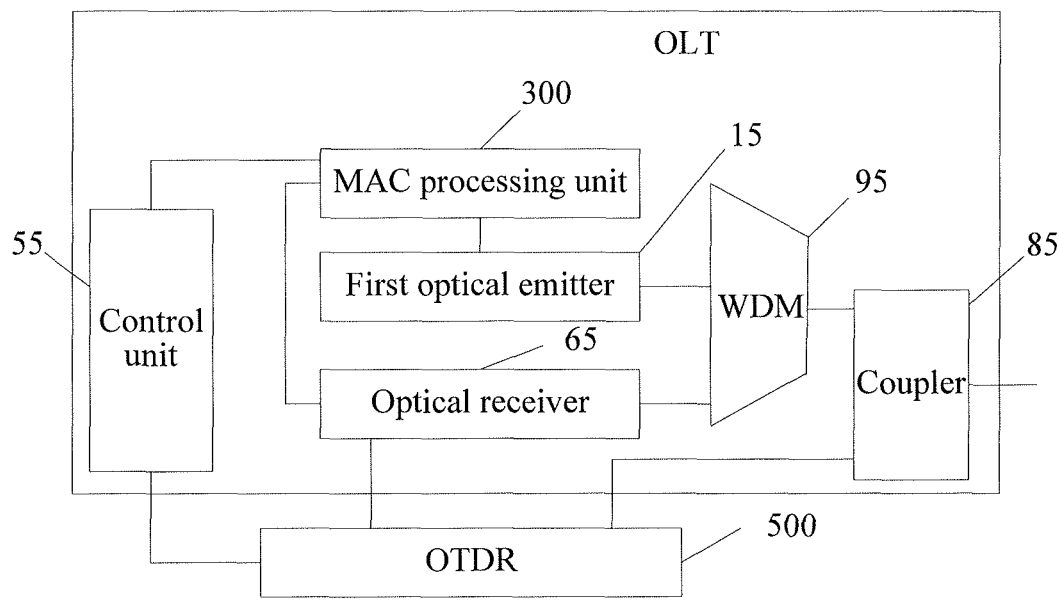
FIG. 9 is a schematic diagram of a fifth embodiment of the central office subsystem according to the embodiment of the present invention.

Specifically, as shown in FIG. 9, during the detection, the control unit 55 controls the MAC processing unit 300 to notify the first optical emitter 15 of sending a notification message for notifying the ONU of stopping sending an uplink data transmission signal. After the optical receiver 65 receives the uplink data sent by the last ONU according to bandwidth allocation information, the control unit 55 notifies the OTDR 500 of sending the test excitation signal through the OTDR interface. The test excitation signal sent by the OTDR 500 is sent out after being coupled by the coupler 85. The backward reflected and/or scattered signal of the test excitation signal is received by the optical receiver 65 after passing through the coupler 85 and the WDM 95, and then is sent to the OTDR 500 to be processed, so as to obtain the state information of the line.

After the test is finished, the control unit 55 controls the MAC processing unit 300 to re-send information for authorizing the ONU to send the uplink data through the first optical emitter 15.

Figure 10:
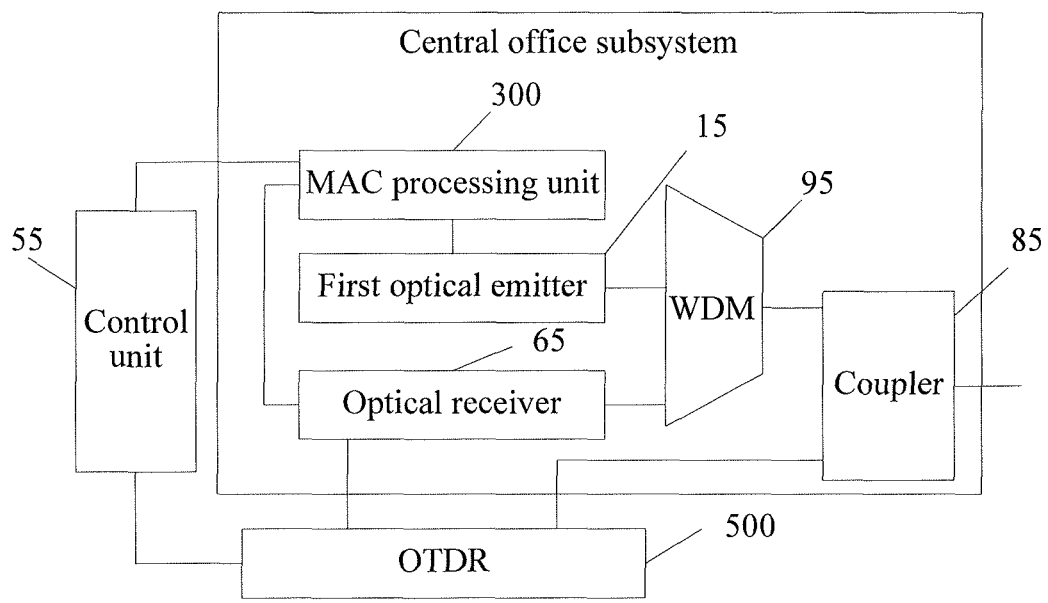
FIG. 10 is a schematic diagram of a sixth embodiment of the central office subsystem according to the embodiment of the present invention.

The control unit 55 may be an independent dedicated server, such as a test management server, and is configured to initiate and control the test process. As shown in FIG. 10, the equipment controls the OLT and the OTDR 500/OFDR to finish the switching between data transmission and test in the uplink direction (1310 nm). When a test needs to be performed, the equipment notifies the OLT of starting the specified test window or a test quiet window, and notifies the OTDR/OFDR of sending the test signal after the uplink data of the last uplink authorized ONU reaches the OLT, and controls the OLT to perform uplink authorization on the ONU again after the test window ends.

Specifically, when the test conditions are satisfied, the control unit 55 notifies the OLT of starting a test window, and notifies the OTDR of performing a test in the test window. The message of which the control unit 55 notifies the OLT may include information such as time to start the test window and a time length of the test window. The message of which the control unit 55 notifies the OTDR of starting the test may include information such as time to send a signal of starting a test and test times.

Figure 11:
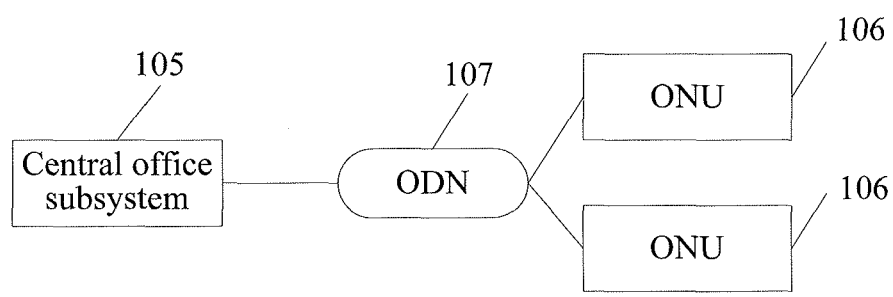
FIG. 11 is a schematic diagram of a detecting system in an ODN according to an embodiment of the present invention.

An embodiment of the present invention further provides an optical communication system. As shown in FIG. 11, the optical communication system includes a central office subsystem 105 and at least one ONU 106. The central office subsystem 105 is connected to the ONU 106 through an ODN 107.

The central office subsystem 105 specifies a test window, sends an optical signal bearing a test excitation signal to the ODN 107 in the specified test window with a second wavelength, in which the second wavelength is the same as a wavelength of an optical signal used for uplink data transmission.

The central office subsystem 105 receives an optical signal reflected and/or scattered by the ODN 107 in the specified test window, performs time-domain or frequency-domain analysis on the received optical signal reflected and/or scattered by the ODN 107, and obtains line evaluation information of the ODN 107.

The central office subsystem 105 is connected to the ONU 106 through the ODN 107. A structure of the central office subsystem 105 is consistent with that of the apparatus provided in the apparatus embodiment of the present invention. The central office subsystem 105 may be an OLT or another equipment with same or similar functions. The ONU 106 may another terminal equipment.

Specifically, the central office subsystem 105 reserves a test window, and in the test window, the central office subsystem 105 instructs the ONU 106 to stop sending uplink data.

A manner of reserving the test window is that, the central office subsystem 105 specifies a null window forbidding any ONU 106 to send the uplink data as the test window during bandwidth allocation.

The central office subsystem 105 sends bandwidth allocation information to the ONU 106, and the sending manner may be broadcasting.

In another way of determining the test window, the central office subsystem 105 sends a message for instructing all the ONUs to stop sending the uplink data or to turn off the laser, in which the message may be a halt instruction, and the halt instruction may be an ONU Halt instruction consistent with an activation process or ranging process defined in a current GPON standard, for example, a downlink packet does not include an uplink authorized BWMAP; and the message may also be a new OAM message, such as OMCI or a PLOAM message.

The central office subsystem 105 continues to receive the uplink data sent by the ONU 106. After the uplink data of the last ONU 106 reaches the central office subsystem 105, the central office subsystem 105 sends a test excitation signal, and a wavelength of the test excitation signal is the same as that of the uplink signal, such as, 1310 nm. At the same time, the central office subsystem 105 may also normally send a downlink data signal to the ONU 106. Therefore, a downlink channel has the downlink signal and the test excitation signal simultaneously.

In an uplink direction, the central office subsystem 105 receives a backward scattered signal and/or reflected signal of the test excitation signal, and calculates and obtains an attenuation curve and a reflection event curve of the ONU 106 according to the backward reflected signal and/or the backward scattered signal.

If necessary, the central office subsystem 105 may emit the test excitation signal for multiple times, so as to detect a line state of the ODN 107 between the central office subsystem 105 and the ONU 106.

After the test process ends, the central office subsystem 105 performs uplink direction authorization on all the ONUs 106 again, or turns on a laser transmitter of the ONU again.

It can be seen from the above embodiments that, in the present invention, no other hardware facilities are added when the line of the ODN is detected, and the downlink data is normally sent while the downlink detection signal is being sent, so the sending of the downlink data is not influenced. Thereby, the implementation cost is low. In addition, the central office subsystem controls the OTDR processing unit to emit the test excitation signal, and after the backward scattered signal and the backward reflected signal of the test excitation signal are received, the signals are directly sent to the OTDR processing unit to be processed, so that the technical implementation is simple.

Apparently, persons skilled in the art may make any modification and variation to the present invention. In view of the foregoing, it is intended that the present invention cover modifications and variations of the present invention provided they fall within the scope of the following claims and their equivalents.

Through the above description of the embodiments, it is apparent to persons skilled in the art that the present invention may be accomplished by software and necessary universal hardware, and definitely may also be accomplished by hardware, but in most cases, the present invention is preferably implemented through the former method. Based on this, the technical solution of the present invention or the part that makes contributions to the prior art can be substantially embodied in the form of a software product. The computer software product may be stored in a readable storage medium, for example, a floppy disk, hard disk, or optical disk of the computer, and contain several instructions used to instruct computer equipment (for example, a PC, a server, or network equipment) to perform the method according to the embodiments of the present invention.

In conclusion, the above are merely exemplary embodiments of the present invention. However, the scope of the present invention is not limited thereto. Changes or replacements readily apparent to persons skilled in the art within the technical scope of the present invention should fall within the scope of the present invention. Therefore, the protection scope of the present invention is subject to the appended claims.

What is claimed is:

1. A central office subsystem, comprising:
an Optical Distribution Network (ODN) interface,
an optical receiver,
a first optical emitter,
a second optical emitter,
a test processing unit, and
a control unit,
wherein the ODN interface is configured to be connected to an ODN;
wherein the optical receiver is coupled with the ODN interface, and is configured to receive an optical signal used for uplink data transmission, wherein a wavelength of the optical signal used for the uplink data transmission is a second wavelength;
wherein the first optical emitter is coupled with the ODN interface, and is configured to send an optical signal used for downlink data transmission, wherein a wavelength of the optical signal used for the downlink data transmission is a first wavelength;
wherein the test processing unit is configured to generate a test excitation signal, send the generated test excitation signal to the second optical emitter, perform time-domain or frequency-domain analysis on an optical signal reflected and/or scattered by the ODN, and obtain line evaluation information of the ODN;
wherein the second optical emitter is configured to emit an optical signal bearing the test excitation signal with the second wavelength; and
wherein the control unit is configured to specify a test window, and control the test processing unit to send and receive a signal in the specified test window.

2. A central office subsystem, comprising:
an Optical Distribution Network (ODN) interface,
an optical receiver,
a first optical emitter,
a second optical emitter,
a test processing unit, and
a control unit,
wherein the ODN interface is configured to be connected to an ODN;
wherein the optical receiver is coupled with the ODN interface, and is configured to receive an optical signal used for uplink data transmission, wherein a wavelength of the optical signal used for the uplink data transmission is a second wavelength;
wherein the first optical emitter is coupled with the ODN interface, and is configured to send an optical signal used for downlink data transmission, wherein a wavelength of the optical signal used for the downlink data transmission is a first wavelength;
wherein the test processing unit is configured to generate a test excitation signal, send the generated test excitation signal to the second optical emitter, perform time-domain or frequency-domain analysis on an optical signal reflected and/or scattered by the ODN, and obtain line evaluation information of the ODN;
wherein the second optical emitter is configured to emit an optical signal bearing the test excitation signal with the second wavelength; and
wherein the control unit is configured to specify a test window, control the test processing unit to send and receive a signal in the specified test window, and notify the first optical emitter of a notification message for notifying the ONU of stopping sending an uplink data transmission signal, so as to specify the test window.

3. A central office subsystem, comprising:
an Optical Distribution Network (ODN) interface,
an optical receiver,
a first optical emitter,
a second optical emitter,
a test processing unit,
a control unit, and
a bandwidth allocation unit,
wherein the ODN interface is configured to be connected to an ODN;
wherein the optical receiver is coupled with the ODN interface, and is configured to receive an optical signal used for uplink data transmission, wherein a wavelength of the optical signal used for the uplink data transmission is a second wavelength;
wherein the first optical emitter is coupled with the ODN interface, and is configured to send an optical signal used for downlink data transmission, wherein a wavelength of the optical signal used for the downlink data transmission is a first wavelength;
wherein the test processing unit is configured to generate a test excitation signal, send the generated test excitation signal to the second optical emitter, perform time-domain or frequency-domain analysis on an optical signal reflected and/or scattered by the ODN and obtain line evaluation information of the ODN;
wherein the second optical emitter is configured to emit an optical signal bearing the test excitation signal with the second wavelength;
wherein the control unit is configured to specify a test window, control the test processing unit to send and receive a signal in the specified test window, and control the bandwidth allocation unit to specify a null window forbidding any ONU to send uplink data as the test window; and
wherein the bandwidth allocation unit is configured to perform uplink timeslot allocation on the uplink data transmission.

4. An optical communication system, comprising:
at least one Optical Network Unit (ONU); and
a central office subsystem, comprising:
an Optical Distribution Network (ODN) interface,
an optical receiver,
a first optical emitter,
a second optical emitter,
a test processing unit, and
a control unit,
wherein the ODN interface is configured to be connected to an ODN,
wherein the optical receiver is coupled with the ODN interface, and is configured to receive an optical signal used for uplink data transmission, wherein a wavelength of the optical signal used for the uplink data transmission is a second wavelength,
wherein the first optical emitter is coupled with the ODN interface, and is configured to send an optical signal used for downlink data transmission, wherein a wavelength of the optical signal used for the downlink data transmission is a first wavelength,
wherein the test processing unit is configured to generate a test excitation signal, send the generated test excitation signal to the second optical emitter, perform time-domain or frequency-domain analysis on an optical signal reflected and/or scattered by the ODN, and obtain line evaluation information of the ODN,
wherein the second optical emitter is configured to emit an optical signal bearing the test excitation signal with the second wavelength, and
wherein the control unit is configured to specify a test window, and control the test processing unit to send and receive a signal in the specified test window;
wherein the central office subsystem is connected to the ONU through an Optical Distribution Network (ODN).

* * * * *